United States Patent

Brooke

[15] 3,641,283

[45] Feb. 8, 1972

[54] SHIM ADJUSTABLE PRESSURE MEMBERS FOR MAGNETIC TAPE TRANSDUCING DEVICES

[72] Inventor: Edric Raymond Brooke, Bishops Stortford, England

[73] Assignee: English Numbering Machines Limited, Enfield, England

[22] Filed: Oct. 17, 1969

[21] Appl. No.: 867,280

[30] Foreign Application Priority Data

Oct. 23, 1968 Great Britain ......................50,339/68

[52] U.S. Cl. ....................179/100.2 Z, 274/4 C, 242/55.19 A

[51] Int. Cl. ....................................G11b 15/28, G11b 23/04

[58] Field of Search ...........179/100.2 Z, 100.2 R, 100.2 MD, 179/100.2 T; 242/55.19 A; 274/4 C, 4 D, 11 F, 11 D; 226/49, 58; 74/399, 242.8

[56] References Cited

UNITED STATES PATENTS

| | | | |
|---|---|---|---|
| 2,719,884 | 10/1955 | Reed et al. | 179/100.2 D |
| 2,541,080 | 2/1951 | Lyon | 74/242.8 |
| 3,210,482 | 10/1965 | Fischer | 179/100.2 Z |
| 3,218,440 | 11/1965 | Albosta | 179/100.2 R |

*Primary Examiner*—Stanley M. Urynowicz, Jr.
*Assistant Examiner*—Alfred H. Eddleman
*Attorney*—Nolte and Nolte

[57] ABSTRACT

A pressure member for pressing a magnetic tape against the tape head of a magnetic tape transducing device is disclosed. The pressure member comprises a rotatable ring of resilient material which is urged towards the tape head so as to compress the resilient material.

Preferably, the ring of resilient material is supported around the circumference of a hollow cylinder of rigid material which is rotatably mounted on an inner stationary cylinder which, in turn, is nonrotatably mounted on a fixed shaft having a noncircular cross section. The inner stationary cylinder is provided with a noncircular, preferably rectangular, axial bore which is complementary to the noncircular cross section of the fixed shaft.

The rectangular complementary cross sections of the fixed shaft and the axial bore of the inner stationary cylinder are so arranged that gaps are formed between walls of the shaft and walls of the complementary rectangular bore. The spacing between the ring of resilient material and the tape head is adjusted by placing shims in the gaps so as to vary the position of the ring of resilient material in a direction or directions perpendicular to the longitudinal axis of the shaft.

The invention is especially applicable to magnetic tape transducing devices of the kind in which a cassette is operatively engageable in a receptacle in which the tape head is mounted, the pressure member being mounted on the cassette and the resilient ring being urged towards the tape head when the cassette is operatively engaged in the receptacle.

4 Claims, 4 Drawing Figures

INVENTOR
EDRIC RAYMOND BROOKE
BY Nolte & Nolte
ATTORNEYS

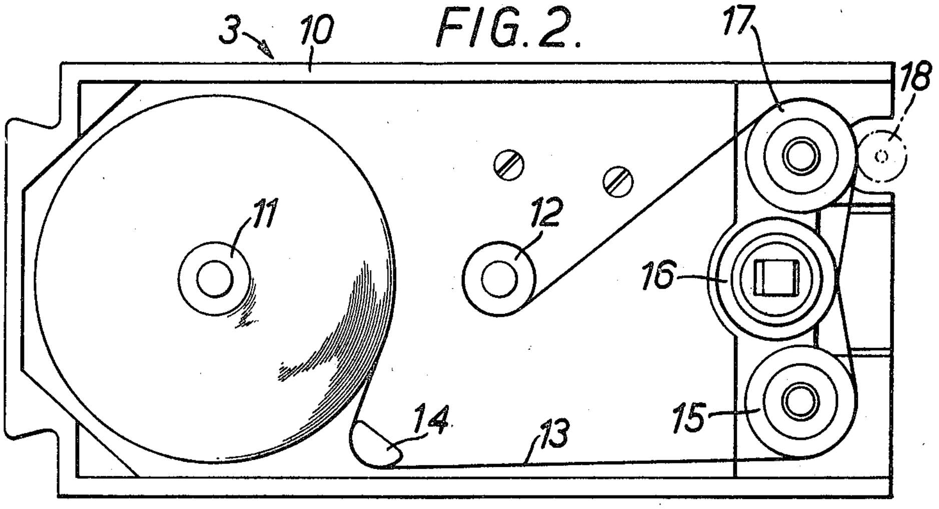
FIG. 3.
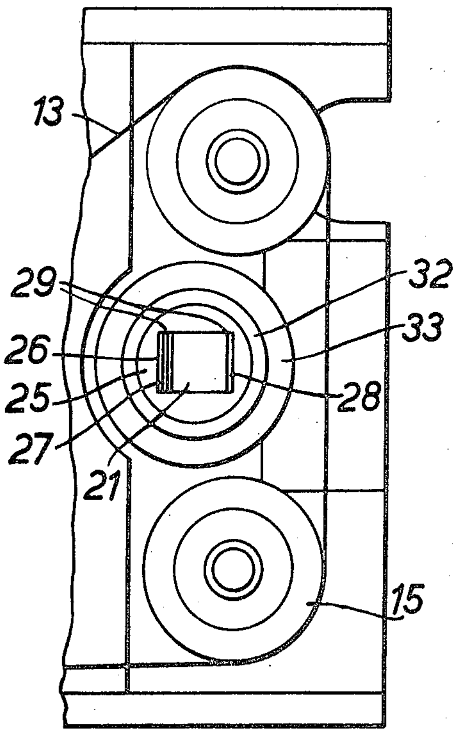
FIG. 4.
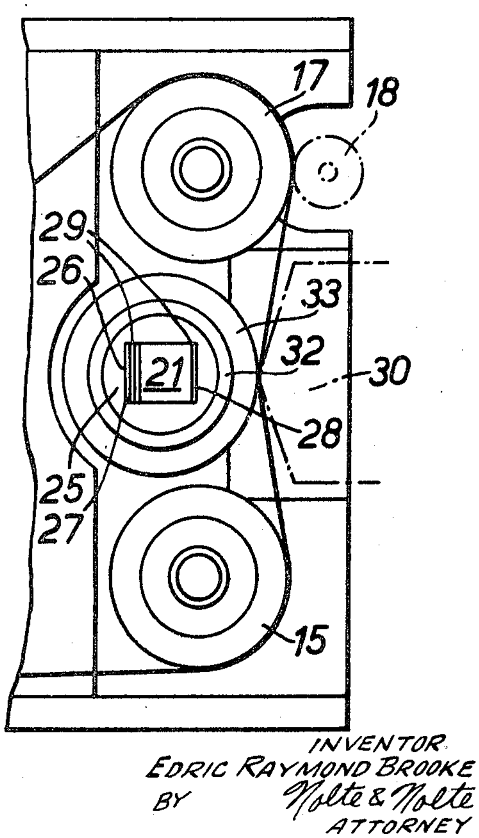
INVENTOR
EDRIC RAYMOND BROOKE
BY Nolte & Nolte
ATTORNEY

SHIM ADJUSTABLE PRESSURE MEMBERS FOR MAGNETIC TAPE TRANSDUCING DEVICES

BACKGROUND OF THE INVENTION

Previously known pressure members for pressing a magnetic tape against a tape head suffer from the disadvantage that the tape is subjected to considerable friction as it moves past the pressure member. Thus, the life of the magnetic tape is shortened due to wear and due to it being subjected to the additional tension necessary to overcome the retarding effect of the friction.

A further disadvantage of known pressure members is that the position of the pressure member relative to the tape head is not conveniently adjustable so as to compensate for the effects of wear on the resilient material of the pressure head and/or that adjustment of the pressure member is not conveniently available in a direction parallel to the movement of the magnetic tape past the head so as to enable the pressure member to be correctly aligned with the tape head.

SUMMARY OF THE INVENTION

Accordingly, it is an object of the present invention to provide an improved pressure member for pressing a magnetic tape against the tape head of a magnetic tape transducing device.

According to the present invention, there is provided a pressure member for pressing a magnetic tape against a head of a magnetic tape transducing device comprising a rotatable ring of resilient material urged towards the tape head to compress the resilient material.

An advantage of a pressure member in accordance with the present invention is that the provision of the rotatable ring of resilient material reduces the friction on the tape as it passes between the resilient material and the tape head, compared to the friction which would arise if the resilient material were nonrotatable.

Another advantage of a pressure member in accordance with the present invention is that the provision of a rotatable ring of resilient material reduces the tension to which the tape is subjected in order to move it past the tape head, compared to the tension to which the tape would be subjected if the resilient material were nonrotatable.

A further advantage of a pressure member in accordance with the present invention is the provision of simple and effective means for adjusting the position of the ring of resilient material relative to the tape head.

BRIEF DESCRIPTION OF THE DRAWINGS.

An embodiment of the invention in which the pressure member is provided in a cassette will now be described by way of example with reference to the accompanying drawings in which:

FIG. 2 is a plan view of the cassette of FIG. 1 with its top plate removed;

FIG. 3 is a plan view of part of the cassette shown in FIG. 2 on a larger scale; and FIG. 4 is a view similar to FIG. 3 but showing the pressure member in engagement with a tape head.

DESCRIPTION OF THE PREFERRED EMBODIMENT

Figure 1:
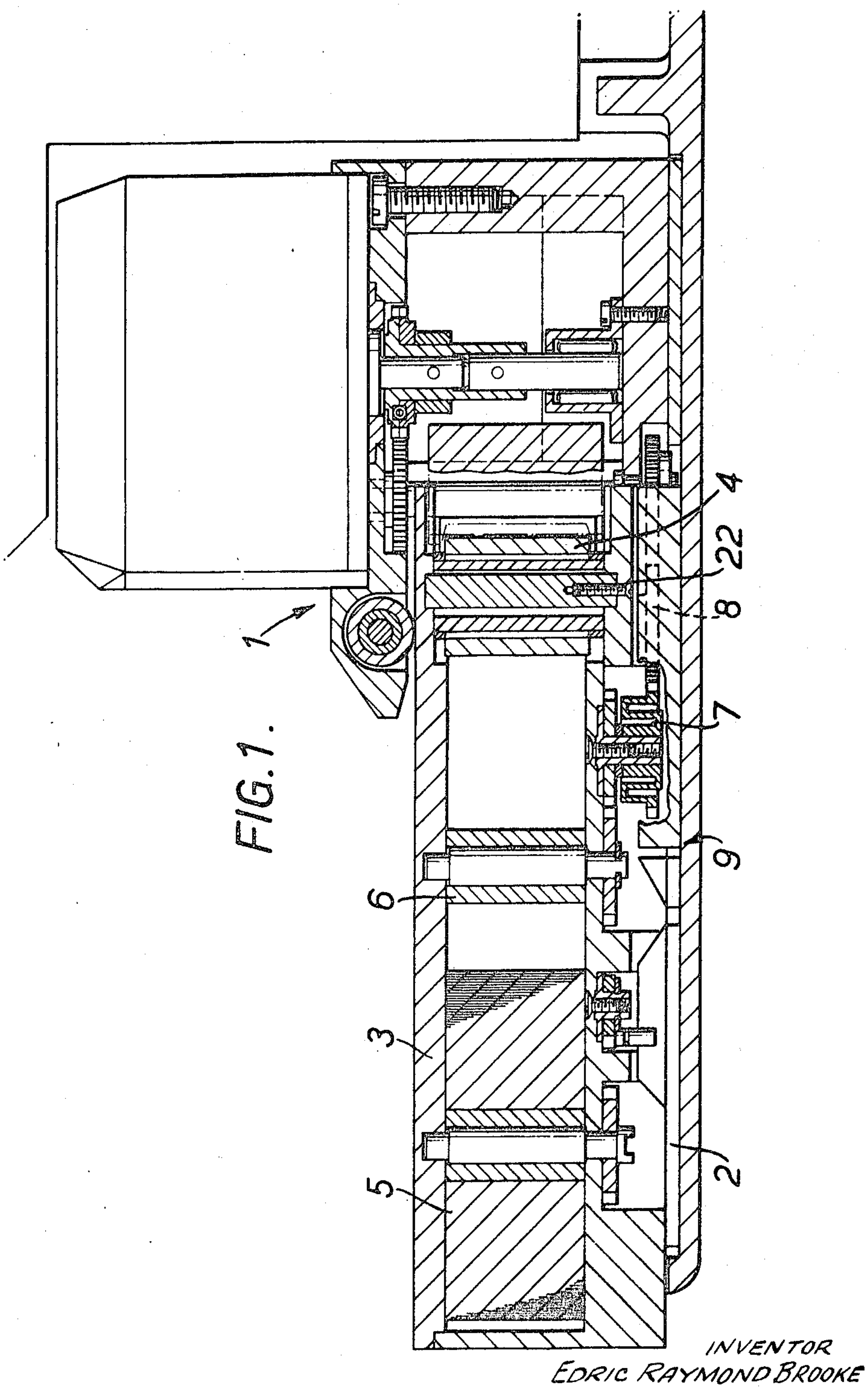
FIG. 1 is a sectional view of a tape recording device for use with cassettes each having a resilient pressure member.

Referring first to FIG. 1 there is shown a recording device for use with a tape cassette having a pressure member according to an embodiment of the invention, the device being indicated generally by reference numeral 1. This device comprises a cassette receptacle 2 shown with a tape cassette 3 retained therein by contact with the receptacle. The tape cassette 3 is provided with a pressure member 4 and has a feed spool 5 and a takeup spool 6. The takeup spool is driven by a deformable gear 7 through gearing 8 indicated in broken lines and provided in the device 1. The cassette receptacle 2 is also provided with a guide arrangement indicated generally at 9 for ensuring the correct insertion of the tape cassette 3 into the device 1 and for retaining the cassette in an operative position in the receptacle.

As shown in FIG. 2 the tape cassette 3 comprises a casing 10 having a flangeless feed spool 11 and a flangeless takeup spool 12. A tape 13 passes from the feed spool 11 around a guide 14 towards the front of the cassette 3, around an idler roller 15, across a resilient pressure member 16, around a further idler roller 17, cooperating with a drive capstan of the device 1 and indicated at 18 by broken lines, and passes to the takeup spool 12.

As can be seen from FIGS. 3 and 4, the resilient pressure member 16 of FIG. 2 comprises a rectangular stationary shaft 21 mounted on a sidewall of the cassette casing 2 by a bolt 22 (see also FIG. 1). A stationary cylindrical member 25 surrounds the shaft 21, the member having an axial bore 26 of a cross section complementary to that of the shaft 21. Gaps 27 and 28 are provided between two opposite sides of the bore 26 and the shaft 21. Into the gaps 27 and 28, shims 29 are inserted. By means of the shims 29, the position of the cylindrical member 25 is adjustable at right angles to the axis of the shaft 21 in the direction towards and away from the position 30 of the head as shown in FIG. 4.

A further cylinder 32 surrounds the cylindrical member 25. The further cylinder 32 is rotatable about the cylindrical member 25. Bonded to or supported on the rotatable cylinder 32 is a resilient ring 33 for pressing the tape 13 against the tape head.

When the tape cassette 3 is moved into its operating position shown in FIG. 1, the tape cassette is retained so that the resilient ring 33 is urged towards the tape head 30 of FIG. 4, and pushes the tape firmly against the tape head. As can be seen, the outer part of the resilient ring 33 facing the head assumes a shape reverse to that of the head and thereby ensures good contact between the tape, indicated by reference 13 in FIG. 1, and the head indicated by reference 30 in FIG. 4. The pressure is adjustable by the use of the shims 29 and which are movable from one side of the shaft 21 to the other side thereof so as to compensate for any wearing of the cylinder 32 or of the resilient ring 33.

The provision of the resilient ring 33 which is rotatable about the cylindrical member 25 reduces the friction on the tape which would be caused if the pressure member were nonrotatable. In this way the life of the tape may be lengthened by reduction of wear and reduction of tension.

It is to be understood that deformation of the resilient ring 33 takes place only in the region of the pole faces of the tape head 30. In this way the tape is held intimately against the pole faces of the tape head 30 in accordance with their curvature, but is free of the head when it is outside the region of the pole faces.

It will be appreciated that modifications of the embodiment described are possible. For example, the other two sides of the shaft 21 may also be provided with shims so as to provided additional adjustment of the ring in a direction perpendicular to the existing adjustment. If the shaft is repositioned so that one of its corners faces the tape head 30 of FIG. 4, the provision of spaces on all sides of the shaft 21 would permit the adjustment of the ring towards and away from the tape head and adjustment in a direction parallel to the movement of the tape past the head. Thus, adjustment may be provided in two mutually perpendicular directions at 45° to the line joining the axis of the shaft 21 and the center of the tape head. Other cross sections of shaft and bore may be used. For the adjustment of the resilient ring 33 it is advisable for the shaft 21 to have at least one pair of opposite faces suitable for the insertion of shims 29.

While in the embodiment described the resilient ring is driven by the tape passing over the head, it is alternatively possible to provide a direct drive for the ring so as to prevent undue strain on the tape.

The above described embodiment relates to the use of the pressure member in a cassette, but a pressure member according to an embodiment of the invention may be provided in a device having fixed spool positions and a head fixed in relation thereto. In these circumstances, preferably means are provided for moving the pressure member towards and away from the head for facilitating threading of the tape between the pressure member and the head.

I claim:

1. In a magnetic tape transducing device, comprising a magnetic tape cassette operatively engageable in a receptacle on which the tape head of the device is mounted, the improvement comprising a pressure member comprising in combination a nonrotatable fixed shaft mounted on said cassette, said shaft having a longitudinal axis of symmetry, a first cylinder nonrotatably mounted on said shaft, said shaft and said bore of said cylinder having complementary noncircular cross sections, a cylinder of rigid material rotatably mounted on said first cylinder, a ring of resilient material supported on said cylinder of rigid material, and retaining means provided by cooperating elements of said receptacle and said cassette to retain said cassette in said receptacle and urge said ring towards said tape head to compress said resilient material.

2. A pressure member as defined in claim 1, wherein said cross sections are polygonal and comprising shims selectively located between said shaft and said bore to adjust the position of said ring relative to said tape head.

3. A pressure member as defined in claim 2, wherein said cross sections are rectangular, said shims being selectively located adjacent opposite walls of said shaft to adjust the position of said ring relative to said tape head.

4. A pressure member as defined in claim 3, wherein two pairs of mutually opposite sets of shims are selectively located between said shaft and said bore to adjust the position of said ring in a first line perpendicular to and in a second line parallel to the movement of said magnetic tape past said tape head.

* * * * *